(12) United States Patent
Kabuo

(10) Patent No.: US 6,282,558 B1
(45) Date of Patent: Aug. 28, 2001

(54) DATA PROCESSING SYSTEM AND REGISTER FILE

(75) Inventor: Hideyuki Kabuo, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/213,369

(22) Filed: Dec. 17, 1998

(30) Foreign Application Priority Data

Dec. 19, 1997 (JP) .................................................. 9-350531

(51) Int. Cl.[7] ................................. G06F 7/38; G06F 7/00
(52) U.S. Cl. ............................................ 708/552; 708/525
(58) Field of Search .................................. 708/490, 495, 708/498, 552, 553, 530, 525

(56) References Cited

U.S. PATENT DOCUMENTS

| | | | | |
|---|---|---|---|---|
| 4,649,508 | * | 3/1987 | Kanuma ............................. | 708/496 |
| 4,945,507 | * | 7/1990 | Ishida et al. ...................... | 708/530 |
| 5,038,313 | * | 8/1991 | Kojima .............................. | 708/525 |
| 5,251,166 | * | 10/1993 | Ishida ................................ | 708/493 |
| 5,422,805 | * | 6/1995 | McIntyre et al. .................. | 708/625 |
| 5,889,689 | * | 3/1999 | Alidina et al. .................... | 708/552 |

FOREIGN PATENT DOCUMENTS

| | | |
|---|---|---|
| 59-71542 | 4/1984 | (JP) . |
| 4-167170 | 6/1992 | (JP) . |
| 6-175821 | 6/1994 | (JP) . |
| 7-334346 | 12/1995 | (JP) . |

* cited by examiner

Primary Examiner—Ohuong Dinh Ngo
(74) Attorney, Agent, or Firm—Eric J. Robinson; Nixon Peabody LLP

(57) ABSTRACT

A plurality of units identified by respective addresses are disposed in a register file. Each of the units has a data register for storing data representative of a result of an arithmetic operation, a register for storing an overflow flag indicating the presence or absence of an occurrence of overflow in the arithmetic operation, and a register for storing a sign flag providing an indication of which one of a positive and a negative saturation value should replace the arithmetic operation result in the presence of an occurrence of overflow in the arithmetic operation. Each of the flags is updated in response to a write signal concerning its corresponding register. If at the moment when a data register is fed a read signal, a corresponding overflow flag is set, then either a positive or a negative saturation value, whichever corresponds to the sign flag, is generated on the input side of an arithmetic unit.

5 Claims, 5 Drawing Sheets

DATA PROCESSING SYSTEM AND REGISTER FILE

BACKGROUND OF THE INVENTION

The present invention relates to a data processing system capable of performing a saturation processing function on the occurrence of arithmetic overflow. This invention also relates to a register file adaptable to such a data processing system.

Recent significant developments in the field of LSI technology provide the means of manufacturing high-performance digital signal processors. Sophisticated data processing including various arithmetic operations (such as addition/subtraction and multiplication) can now be performed in a one chip digital signal processor. Such a high-performance digital signal processor has a particular application in the field of mobile telecommunication such as portable telephone apparatus. Mobile telecommunication requires compression and decompression of large volumes of information, and there have been strong demands for high-speed data processing to meet the requirements of portable telephone apparatus.

Various high-speed data processors capable of high-speed data processing have been known in the art. For example, a high-speed data processing system employing a pipeline control architecture is known. This data processing system incorporates therein a small storage-capacity, fast register file in addition to a large storage-capacity memory such as an SRAM (static random access memory) and a slow memory such as a ROM (read-only memory). The data processing system is formed by establishing bus connections between the register file made up of a plurality of data registers for storing data and a plurality of arithmetic units such as an arithmetic-logic unit and a multiplier unit. The register file is used to store arithmetic data. The arithmetic-logic unit receives two operands from the register file and adds together the received two operands in response to, for example, an addition instruction. Data representing the result of an addition operation in the arithmetic-logic unit is written into a selected data register of the register file. On the other hand, the multiplier unit receives two operands from the register file and multiplies together the received two operands in response to a multiplication instruction. Data representing the result of a multiplication operation in the multiplier unit is written into a selected data register of the register file.

An arithmetic operation of two fixed-point numbers X and Y represented in two's complement format is described here. The most significant bits (MSBs) of the numbers X and Y are sign bits. If the MSB of a number is 0, this indicates that the number is positive. On the other hand, if the MSB of a number is 1, this indicates that the number is negative. The radix point is located between the MSB and the second most significant bit. Accordingly, $-1 \leq X < 1$ and $-1 \leq Y < 1$. In other words, the largest in absolute value of all the positive numbers is represented as 011 . . . 1 in binary notation and the largest in absolute value of all the negative numbers is represented as 100 . . . 0 in binary notation. The latter binary number, i.e. 100 . . . 0, is equal to a number of −1 in decimal notation.

An occurrence of arithmetic overflow in an arithmetic operation (such as an addition/subtraction operation and a multiplication operation) sometimes results in the requirement that saturation processing be performed on the result of the arithmetic operation. For example, if addition of two positive numbers causes an arithmetic overflow therefore to produce a negative arithmetic result, such a negative sum result is then corrected to a positive saturation value (i.e. a number having the largest absolute value in all positive numbers, 011 . . . 1 in the foregoing example). If addition of two negative numbers produces a positive arithmetic result, such a positive sum result is then corrected to a negative saturation value (i.e. a number that has the largest absolute value in all negative numbers, 100 . . . 0 in the foregoing example). If subtraction of a negative number from a positive number produces a negative arithmetic result, such a negative remainder result is then corrected to a positive saturation value. On the other hand, if subtraction of a positive number from a negative number produces a positive arithmetic result, such a positive remainder result is then corrected to a negative saturation value. Further, if multiplication of two negative numbers causes an arithmetic overflow therefore to produce a negative result, such a negative product result is then corrected to a positive saturation value. The occurrence of arithmetic overflow is limited to a multiplication of −1 by −1, which can be rewritten to 100 . . . 0 by 100 . . . 0 in binary notation.

In commonly-used data processing systems, at the moment when an overflow occurs in an arithmetic operation, either a positive saturation value or a negative saturation value is immediately written into a data register as a substitute of the result of the arithmetic operation.

In a conventional data processing system, an overflow signal, indicative of the presence or absence of an occurrence of arithmetic overflow, is generated based on the result of an arithmetic operation. Thereafter, either a positive saturation value or a negative saturation value obtained by correction made on the arithmetic operation result is written into a data register. Such a procedure causes delays in completing the execution of the arithmetic operation.

SUMMARY OF THE INVENTION

Accordingly, an object of the present invention is to increase data processing efficiency by achieving swift completion of arithmetic operations with the occurrence of arithmetic overflow.

Another object of the present invention is to provide a register file suitable for saturation processing on the occurrence of overflow in arithmetic operations in a data processing system.

In order to achieve the above-described objects, the present invention provides the following means. In data processing in the present invention (which employs an arithmetic unit having a function of generating an overflow signal indicative of the presence or absence of an occurrence of arithmetic overflow and a data register for storing the result of an arithmetic operation performed in the arithmetic unit), an overflow signal is stored as a flag. If the flag indicates the presence of an occurrence of arithmetic overflow at the moment when the data register is about to be read (in other words, the data stored in the data register is about to be read out), then either a positive or a negative saturation value is generated. The saturation value thus generated is passed to the arithmetic unit as a correction value for the arithmetic operation result. Unlike conventional data processing, neither a positive nor a negative saturation value as a result of correction made on the result of an arithmetic operation is written into the data register in the present invention, thereby achieving swift completion of the execution of the arithmetic operation. Additionally, such a saturation value is generated at the moment when the arithmetic operation result is about to be referred to. The time taken to complete such saturation value generation is hidden behind the time taken to read data from the data register in the absence of an occurrence of arithmetic overflow. Accordingly, the start of arithmetic operations that make reference to an overflow result will not be delayed.

The present invention provides a data processing system which performs a saturation processing function on the occurrence of arithmetic overflow. The data processing system of the present invention comprises (a) an arithmetic unit which performs a function of executing a specified arithmetic operation and generating an overflow signal indicative of the presence or absence of an occurrence of overflow in the arithmetic operation, (b) a data register for storing data representative of an arithmetic operation result produced in the arithmetic unit, (c) an overflow flag register for storing the overflow signal generated in the arithmetic unit as an overflow flag, and (d) a selector for selecting between the data stored in the data register and a fixed saturation value for forwarding to the arithmetic unit, wherein at the moment when the data register is about to be read: (i) if the overflow flag indicates the absence of an occurrence of arithmetic overflow, the selector then selects and provides the data stored in the data register to the arithmetic unit, and (ii) if the overflow flag indicates the presence of an occurrence of arithmetic overflow, the selector then selects and provides the fixed saturation value to the arithmetic unit.

If the overflow signal indicates the presence of an occurrence of arithmetic overflow, then the data register is write inhibited. In other words, no data are allowed to be written into the data register. This eliminates the consumption of power necessary for writing an invalid arithmetic operation result into the data register. Additionally, if the overflow flag indicates the presence of an occurrence of arithmetic overflow at the moment when the data register is about to be read, the data stored in the data register is made invalid when actually read out therefrom. This reduces the consumption of power necessary for reading an invalid arithmetic operation result from the data register.

Which one of a positive and a negative saturation value the selector should select as the fixed saturation value is determined according to a sign flag. The arithmetic unit further performs a function of generating, in the presence of an occurrence of overflow in an arithmetic operation, a saturation value sign signal providing an indication of which one of a positive and a negative saturation value should replace the result of the arithmetic operation. The data processing system of the present invention further comprises a sign flag register for storing the saturation value sign signal generated in the arithmetic unit as the sign flag.

The present invention provides a register file having a plurality of register units identified by respective addresses. Each of the register units comprises (a) a data register for storing data representative of the result of an arithmetic operation executed, (b) an overflow flag register for storing, as an overflow flag, an overflow signal indicating the presence or absence of an occurrence of overflow in the arithmetic operation, in response to a write signal which directs that the data register is written, and (c) a sign flag register for storing, as a sign flag, a saturation value sign signal providing an indication of which one of a positive and a negative saturation value should replace the arithmetic operation result in the presence of an occurrence of overflow in the arithmetic operation, in response to the write signal. Each of the overflow and sign flags is updated in response to a write signal which directs that the data register is written. If the overflow flag indicates the absence of an occurrence of arithmetic overflow at the moment when a read signal directing the data register to be read is provided, then the data stored in the data register is outputted, while if the overflow flag indicates the presence of an occurrence of arithmetic overflow at such a moment, then both of the overflow flag and the sign flag are outputted.

DETAILED DESCRIPTION OF THE INVENTION

Preferred embodiments of the present invention will be illustrated by reference to the attached drawing figures. The present invention is described using an example of an arithmetic operation of two fixed-point numbers represented in two's complement format. The most significant bits (MSBs) of the fixed-point numbers are sign bits. If the sign bit (MSB) of a number is 0, then the number is positive. On the other hand, if the sign bit (MSB) of a number is 1, then the number is negative. The radix point is located between the sign bit (MSB) and the second most significant bit. It is however to be noted that the present invention is not limited to such a manner of representing numbers.

Figure 1:
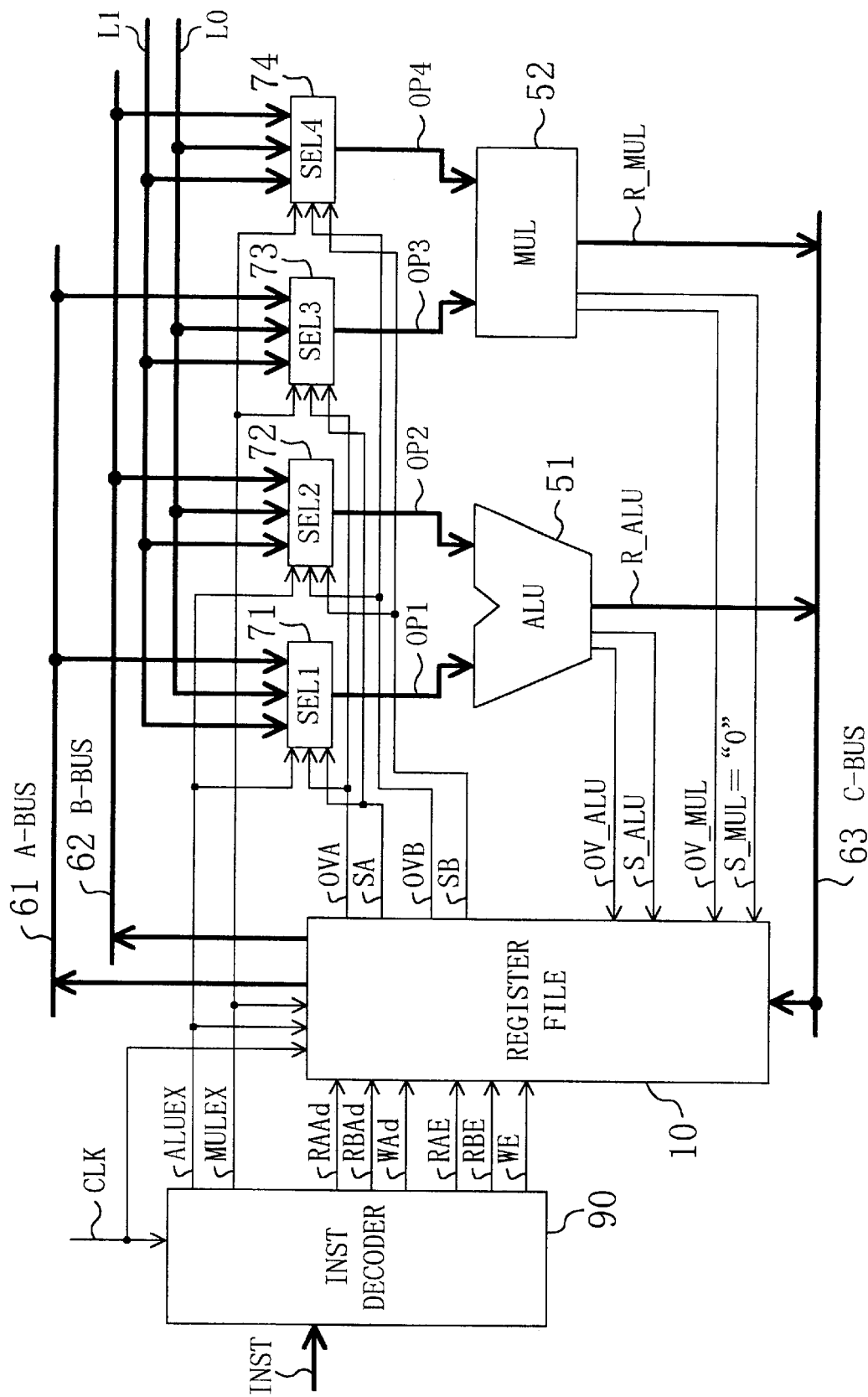
FIG. 1 is a block diagram illustrating a data processing system in accordance with the present invention.

FIG. 1 shows a data processing system in accordance with the present invention. The data processing system of FIG. 1 performs data processing by sequential execution of input instructions INST. The data processing system of FIG. 1 has a register file 10 having four data registers for data storage, an arithmetic-logic unit (ALU) 51 for executing instructions such as addition instructions, subtraction instructions, logic instructions, a multiplier unit (MUL) 52 for executing multiplication instructions, an A bus 61, a B bus 62, and a C bus 63. The register file 10 performs a function of sending operands onto both of the A and B buses 61 and 62 or onto either one of them and storing data present on the C bus 63 in a selected one of the four data registers. In response to, for example, an addition instruction, the ALU 51 receives an operand OP1 from the A bus 61 and an operand OP2 from the B bus 62 and performs addition of the two operands OP1 and OP2 to generate data R_ALU representative of the result of the arithmetic addition operation. The result data R_ALU is written, by way of the C bus 63, into a selected one of the four data registers of the register file 10. In response to a multiplication operation, the MUL 52 receives an operand OP3 from the A bus 61 and an operand OP4 from the B bus 62 and performs multiplication of the two operands OP3 and OP4 to generate data R_MUL representative of the result of the arithmetic multiplication operation. The result data R_MUL is likewise written, by way of the C bus 63, into a selected one of the four data registers of the register file 10.

The ALU 51 provides the following functions. The ALU 51 performs a function of generating an overflow signal OV_ALU indicative of the presence or absence of an occurrence of overflow in an arithmetic operation (e.g. an addition operation or a subtraction operation of two fixed-point numbers represented in two's complement format) performed in the ALU 51. In addition to such a function, the ALU 51 performs a function of generating a saturation value sign signal S_ALU providing an indication of which one of a positive and a negative saturation value should replace the result of the arithmetic operation in the presence of an occurrence of arithmetic overflow. If the overflow signal OV_ALU conveys a value of 1 (OV_ALU=1), this indicates the presence of an occurrence of arithmetic overflow. If the overflow signal OV_ALU conveys a value of 0 (OV_ALU=0), this indicates the absence of an occurrence of arithmetic overflow. If the saturation value sign signal S_ALU conveys a value of 0 (S_ALU=0), this indicates a positive saturation value. If the saturation value sign signal S_ALU conveys a value of 1 (S ALU=1), this indicates a negative saturation value. At this time, both of the two operands OP1 and OP2 are sign extended by one bit place in high-order direction and are subjected to addition/subtraction. The overflow signal OV_ALU is activated to logical one if the most and second most significant bits of the result of the arithmetic addition/subtraction operation differ from each other. The saturation value sign signal S_ALU is determined by the extended sign bit of an arithmetic operation result, by the sign bit of an arithmetic operation result (which is positioned one bit place in low-order direction from the extended sign bit of the arithmetic operation result), by a combination of the type of arithmetic operation (addition or subtraction) and the sign bit of the operand OP1, or by a combination of the type of arithmetic operation and the sign bit of the operand OP2.

The MUL 52 provides the following functions. The MUL 52 performs a function of generating an overflow signal OV_MUL indicative of the presence or absence of an occurrence of overflow in an arithmetic operation (multiplication of two fixed-point numbers represented in two's complement format) performed in the MUL 52. In addition to such a function, the MUL 52 performs a function of generating, in the presence of an occurrence of arithmetic overflow in the arithmetic operation, a saturation value sign signal S_MUL providing an indication of which one of a positive and a negative saturation value should replace the result of the arithmetic operation. If the overflow signal OV_MUL conveys a value of 1 (OV_MUL=1), this indicates the presence of an occurrence of arithmetic overflow. If the overflow signal OV_MUL conveys a value of 0 (OV_MUL=0), this indicates the absence of an occurrence of arithmetic overflow. Since the occurrence of arithmetic overflow is limited to multiplication of −1 by −1 (in other words, an overflow occurs when both of the operands OP3 and OP4 are 100 . . . 0 in binary notation), the logical value of the saturation value sign signal S_MUL is limited to logical 0 so as to prevent a negative saturation value from being selected. The register file 10 further provides the following functions. The register file 10 performs a function of storing the overflow signal OV_ALU and the saturation value sign signal S_ALU (both of which are generated by the ALU 51) as an overflow flag and as a sign flag, respectively. In addition to such a function, the register file 10 performs a function of storing the overflow signal OV_MUL and the saturation value sign signal S_MUL (both of which are generated by the MUL 52) as an overflow flag and as a sign flag, respectively.

The data processing system of FIG. 1 further includes a first selector 71 connected between the A bus 61 and the ALU 51, a second selector 72 connected between the B bus 62 and the ALU 51, a third selector 73 connected between the A bus 61 and the MUL 52, a fourth selector 74 connected between the B bus 62 and the MUL 52, and an instruction decoder 90 for decoding the input instruction INST. According to the input instruction INST, the instruction decoder 90 provides a first read address RAAd, a second read address RBAd, a write address WAd, a first read enable signal RAE, a second read enable signal RBE, a write enable signal WE, an addition/subtraction execution signal ALUEX, and a multiplication execution signal MULEX. Here, the addition/subtraction execution signal ALUEX is made active if the input instruction INST is an addition/subtraction instruction. The multiplication execution signal MULEX is made active if the input instruction INST is a multiplication instruction. The register file 10 receives these eight signals from the instruction decoder 90. The signal ALUEX is sent also to the first and second selectors 71 and 72. The signal MULEX is also sent to the third and fourth selectors 73 and 74. The register file 10 further provides the following functions. The register file 10 performs a function of sending signals on the A bus side (i.e. an overflow signal OVA and a saturation value sign signal SA) to the first and third selectors 71 and 73. In addition to such a function, the register file 10 performs a function of sending signals on the B bus side (i.e. an overflow signal OVB and a saturation value sign signal SB) to the second and fourth selectors 72 and 74. The overflow signals OVA and OVB are generated according to the overflow flag stored in the register file 10. The saturation value sign signals SA and SB are generated according to the sign flag stored in the register file 10. A common clock signal CLK is applied to the register file 10 and to the instruction decoder 90 for establishing synchronization of the operation of the register file 10 and that of the instruction decoder 90.

The first selector 71 selects among the following data according to the following conditions and provides the selected data to the ALU 51 as the operand OP1. For example, if the signal OVA assumes a value of 0 (OVA=0) at the moment when a certain one of the data registers of the register file 10 is about to be read by way of the A bus 61, this condition causes the first selector 71 to select and provide the data stored in the data register to the ALU 51 as the operand OP1. If OVA=1 and SA=0, this condition causes the first selector 71 to select and provide a positive saturation value (i.e. 011 . . . 1 in binary notation) to the ALU 51 as the operand OP1. If OVA=1 and SA=1, this condition causes the first selector 71 to select and provide a negative saturation value (i.e. 100 . . . 0 in binary notation) to the ALU 51 as the operand OP1.

The second selector 72 selects among the following data according to the following conditions and provides the selected data to the ALU 51 as the operand OP2. For example, if the signal OVB assumes a value of 0 (OVB=0) at the moment when a certain one of the data registers of the register file 10 is about to be read by way of the B bus 62, this condition causes the second selector 72 to select and provide the data stored in the data register to the ALU 51 as the operand OP2. If OVB=1 and SB=0, this condition causes the second selector 72 to select and provide a positive saturation value (i.e. 011 . . . 1 in binary notation) to the ALU 51 as the operand OP2. If OVB=1 and SB=1, this condition causes the second selector 72 to select and provide a negative saturation value (i.e. 100 . . . 0 in binary notation) to the ALU 51 as the operand OP2.

The third selector 73 selects among the following data according to the following conditions and provides the selected data to the MUL 52 as the operand OP3. For example, if the signal OVA assumes a value of 0 (OVA=0) at the moment when a certain one of the data registers of the register file 10 is about to be read by way of the A bus 61, this condition causes the third selector 73 to select and provide the data stored in the data register to the MUL 52 as the operand OP3. If OVA=1 and SA=0, this condition causes the third selector 73 to select and provide a positive saturation value (i.e. 011 . . . 1) to the MUL 52 as the operand OP3. If OVA=1 and SA=1, this condition causes the third selector 73 to select and provide a negative saturation value (i.e. 100 . . . 0) to the MUL 52 as the operand OP3.

The fourth selector 74 selects among the following data according to the following conditions and provides the selected data to the MUL 52 as the operand OP4. For example, if the signal OVB assumes a value of 0 (OVB=0) at the moment when a certain one of the data registers of the register file 10 is about to be read by way of the B bus 62, this condition causes the fourth selector 74 to select and provide the data stored in the data register to the MUL 52 as the operand OP4. If OVB=1 anb SB=0, this condition causes the fourth selector 74 to select and provide a positive saturation value (i.e. 011 . . . 1) to the MUL 52 as the operand OP4. If OVB=1 and SB=0, this condition causes the fourth selector 74 to select and provide a negative saturation value (i.e. 100 . . . 0) to the MUL 52 as the operand OP4.

Inputs of the first to fourth selectors 71–74 are connected to a logical-1 line L1 and to a logical-0 line L0 for the supplying of the fixed saturation values.

Figure 2:
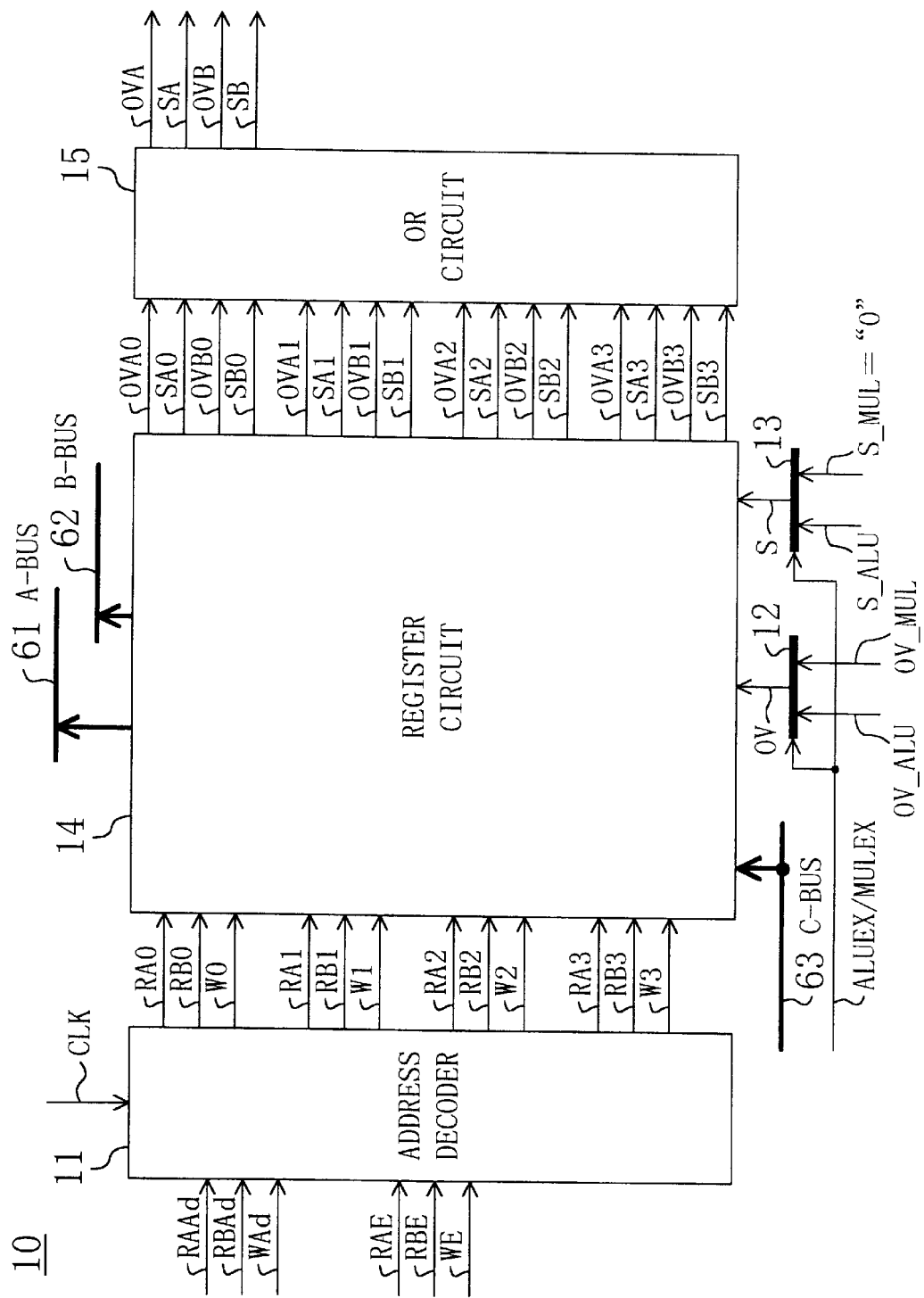
FIG. 2 is a block diagram illustrating in detail a register file of FIG. 1.
Figure 3:
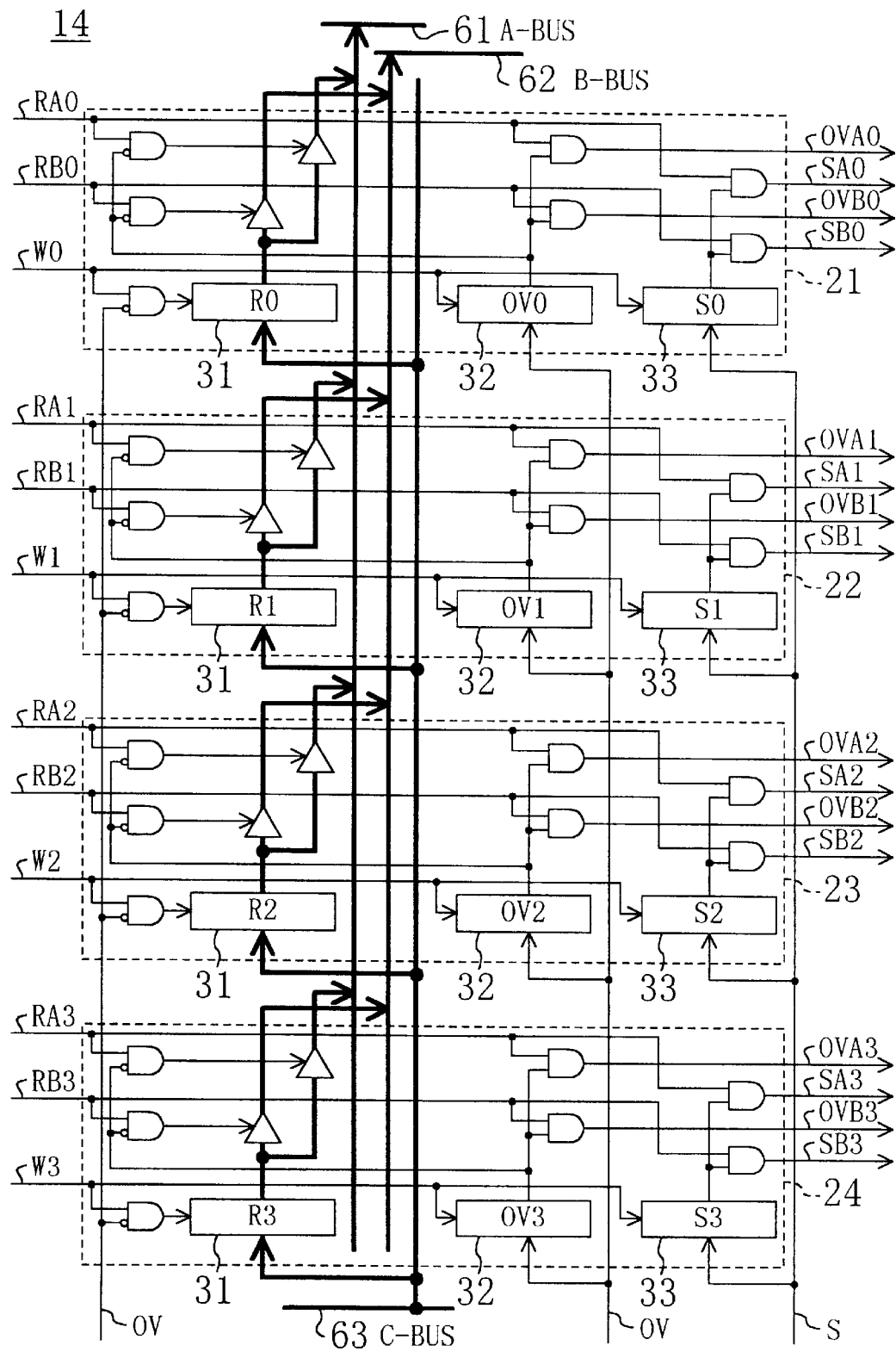
FIG. 3 is a circuit diagram illustrating in detail a register circuit of FIG. 2.
Figure 4:
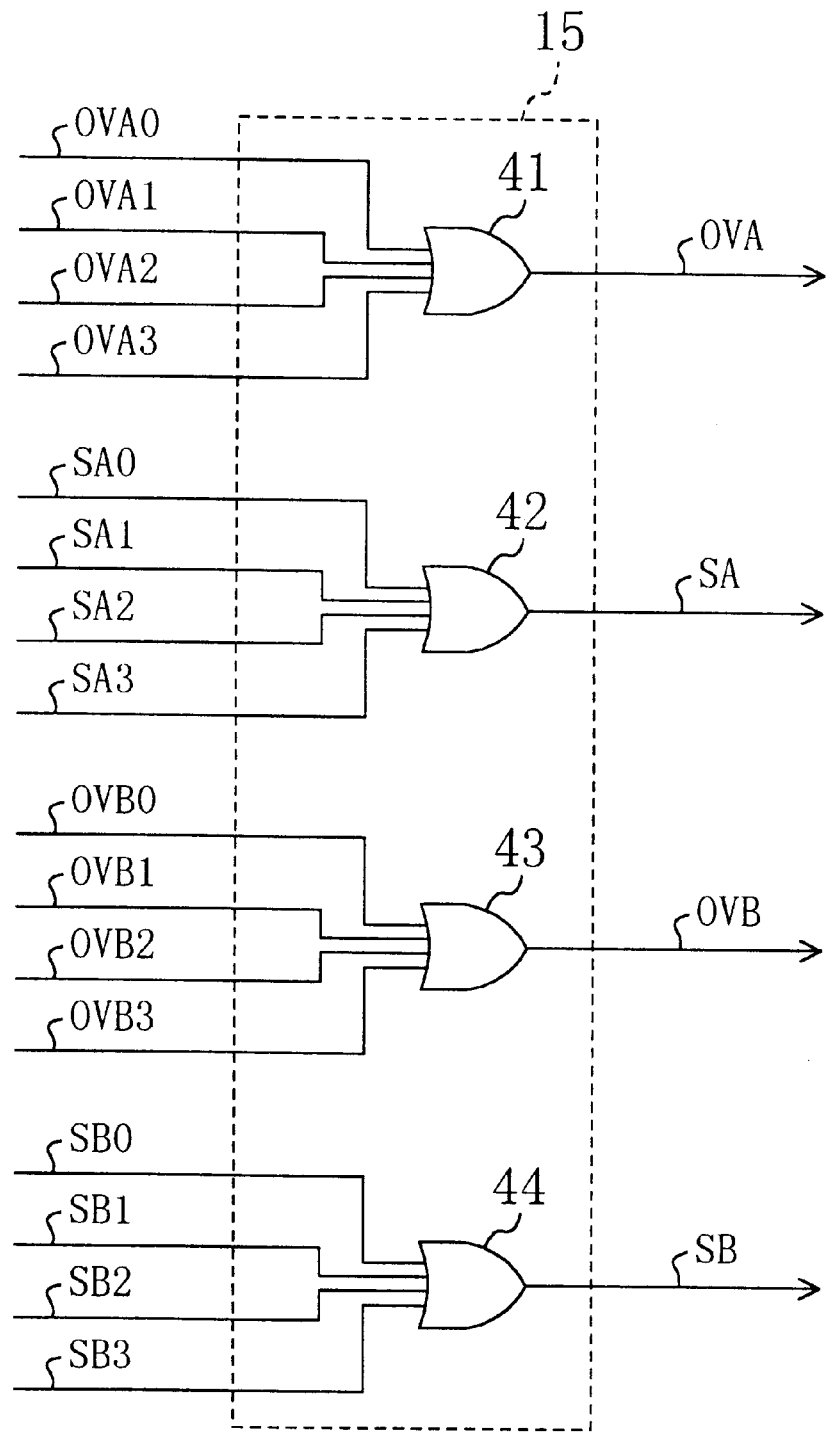
FIG. 4 is a circuit diagram illustrating in detail an OR circuit of FIG. 2.

FIG. 2 shows in detail the structure of the register file 10. FIG. 3 shows in detail the structure of a register circuit 14 of FIG. 2. FIG. 4 shows in detail the structure of an OR circuit 15 of FIG. 2. Referring first to FIG. 2, the register file 10 has an address decoder 11 and selectors 12 and 13 in addition to the circuits 14 and 15. The address decoder 11 receives from the instruction decoder 90 the first read address RAAd, the second read address RBAd, the write address WAd, the first read enable signal RAE, the second read enable signal RBE, and the write enable signal WE. For each data register Rn (n=0, 1, 2, 3), the address decoder 11 sends to the register circuit 14 a first read signal RAn which directs the data register Rn to be read so that the data stored therein is fed onto the A bus 61, a second read signal RBn which directs the data register Rn to be read so that the data stored therein is fed onto the B bus 62, and a write signal Wn which directs the data register Rn to be written so that the data present on the C bus 63 is fed into the data register Rn. The first read address RAAd is in the valid state at the moment when the first read enable signal RAE is provided. The second read address RBAd is in the valid state at the moment when the second read enable signal RBE is provided. The write address WAd is in the valid state at the moment when the write enable signal WE is provided. If ALUEX=1, the selector 12 then selects, as a signal OV, the overflow signal OV_ALU generated by the ALU 51 for forwarding to the register circuit 14. If MULEX=1, the selector 12 then selects, as the signal OV, the overflow signal OV_MUL generated by the MUL 52 for forwarding to the register circuit 14. If ALUEX=1, the selector 13 then selects, as a signal S, the saturation value sign signal S_ALU generated by the ALU 51 for forwarding to the register circuit 14. If MULEX=1, the selector 13 then selects, as the signal S, the saturation value sign signal S_MUL generated by the MUL 52 for forwarding to the register circuit 14.

Referring now to FIG. 3, the four data registers R0–R3 are explicitly shown. In FIG. 3, the register circuit 14 has four identically-structured register units 21–24. These four register units 21–24 are assigned respective address 0–3 for identification. The register units 21–24 each have a data register 31, an overflow flag register 32, and a sign flag register 33.

The register unit 21, which is identified by the address 0, is described here. The data register (R0) 31 is disposed to store data transmitted from the C bus 63 in response to a write signal W0. It is however arranged such that if the signal OV supplied from the selector 12 conveys a logical value of 1, the data register R0 is write inhibited (in other words, no data are allowed to be written into the data register R0). The overflow flag register 32 is disposed to store the signal OV supplied from the selector 12 as an overflow flag OV0, in response to the write signal W0 which directs the data register R0 to be written. The sign flag register 33 is disposed to store the signal S supplied from the selector 13 as a sign flag S0, in response to the write signal W0 which directs the data register R0 to be written. RA0 indicates a first read signal which directs that the data stored in the data register R0 is read onto the A bus 61. RB0 indicates a second read signal which directs that the data stored in the data register R0 is read onto the B bus 62. Accordingly, the data stored in the data register R0 is outputted to the A bus 61 via a tri-state buffer which operates in response to the first read signal RA0 or is outputted onto the B bus 62 via a tri-state buffer which operates in response to the second read signal RB0. If the overflow flag OV0 is logical 1 at the moment when the first read signal RA0 is provided (which indicates the presence of an occurrence of arithmetic overflow), it is arranged such that the A bus 61 is not driven. Additionally, if the overflow flag OV0 is logical 1 at the moment when the second read signal RB0 is provided (which indicates the presence of an occurrence of arithmetic overflow), it is arranged such that the B bus 62 is not driven. In these cases, the reading of data from the data register R0 is made invalid. When the first read signal RA0 is provided, the overflow flag OV0 and the sign flag S0 are outputted to the OR circuit 15 as signals on the A bus side (i.e. as the overflow signal OVA0 and as the saturation value sign signal SA0). On the other hand, when the second read signal RB0 is provided, the overflow flag OV0 and the sign flag S0 are outputted to the OR circuit 15 as signals on the B bus side (i.e. as the overflow signal OVB0 and as the saturation value sign signal SB0). The other register units 22–24, which are identified by the addresses 1–3 respectively, operate in the same way as the register unit 21 and provide their respective overflow signals on the A bus side (OVA1, OVA2, OVA3), saturation value sign signals on the A bus side (SA1, SA2, SA3), overflow signals on the B bus side (OVB1, OVB2, OVB3), and saturation value sign signals on the B bus side (SB1, SB2, SB3).

Referring now to FIG. 4, the OR circuit 15 is made up of four OR gates 41–44. The OR gate 41 is disposed to send, as the overflow signal OVA on the A bus side, a logical-sum signal (which represents a logical sum of the overflow signals OVA0, OVA1, OVA2, and OVA3 supplied from the register circuit 14) to the first and third selectors 71 and 73. The OR gate 42 is disposed to send, as the saturation value sign signal SA on the A bus side, a logical-sum signal (which represents a logical sum of the saturation value sign signals SA0, SA1, SA2, and SA3 supplied from the register circuit 14) to the first and third selectors 71 and 73. The OR gate 43 is disposed to send, as the overflow signal OVB on the B bus side, a logical-sum signal (which represents a logical sum of the overflow signals OVB0, OVB1, OVB2, and OVB3 supplied from the register circuit 14) to the second and fourth selectors 72 and 74. The OR gate 44 is disposed to send, as the saturation value sign signal SB on the B bus side, a logical-sum signal (which represents a logical sum of the saturation value sign signals SB0, SB1, SB2, and SB3 supplied from the register circuit 14) to the second and fourth selectors 72 and 74.

Figure 5:
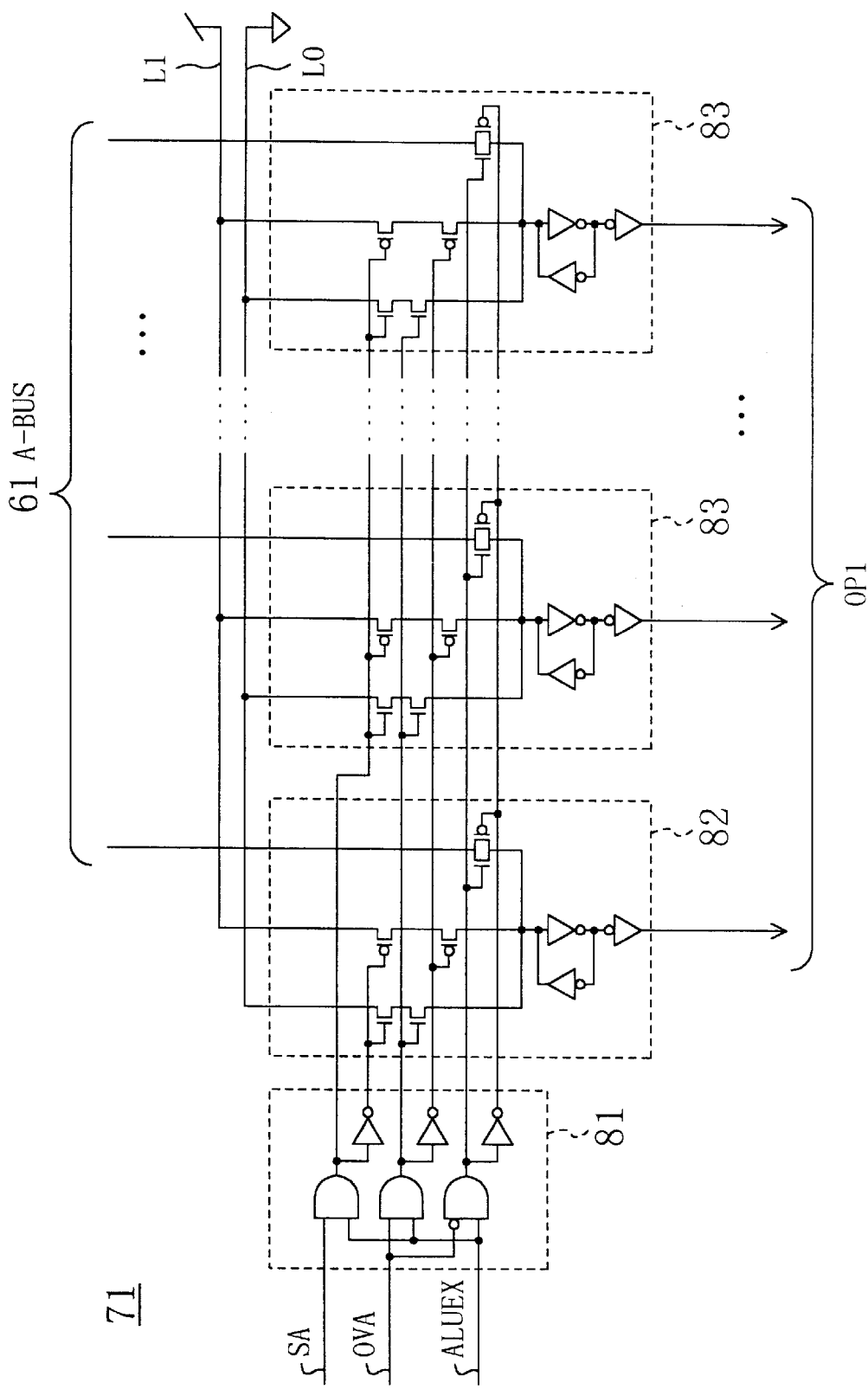
FIG. 5 is a circuit diagram illustrating in detail a first selector of FIG. 1.

FIG. 5 shows the detail of the structure of the first selector 71 connected between the A bus 61 and the ALU 51. The first selector 71 is made up of a control circuit 81, a most significant bit (MSB) circuit 82, and a plurality of low-order bit circuits 83. The control circuit 81, only when activated by the addition/subtraction signal ALUEX, controls the operation of each bit circuit 82 and 83 on the basis of the signals OVA and SA on the A bus side. The logical-1 line L1 is coupled to a power supply, while the logical-0 line L0 is coupled to ground. The second to fourth selectors 72–74 are identical in structure with the first selector 71 of FIG. 5.

A concrete example of the operation of the data processing system of FIG. 1 is explained. It is to be noted that in the description, all the overflow flags OV0-OV3 are initialized to 0. Suppose here that the following two instructions (first and second instructions) are executed in sequence.

ADD R0, R1, R2
MUL R0, R0, R3

The first instruction (ADD instruction) directs that (i) addition of data stored in the data register R1 and data stored in the data register R2 is executed in the ALU 51 and (ii) data representing the result of the addition operation is written into the data register R0. In other words, the first instruction is an addition instruction accompanied with a number of 1 (serving as a first source address), a number of 2 (serving as a second source address), and a number of 0 (serving as a destination address). The second instruction (HUL instruction) directs that (i) multiplication of data stored in the data register R0 and data stored in the data register R3 is executed in the MUL 52 and (ii) data representing the result of the multiplication operation is written into the data register R0. In other words, the second instruction is a multiplication instruction accompanied with a number of 0 (serving as a first source address), a number of 3 (serving as a second source address), and a number of 0 (serving as a destination address).

If the instruction decoder 90 decodes the first instruction (ADD instruction), what results is: ALUEX=1; RAAd=1; RBAd=2; and WAd=0. Accordingly, a read signal RA1 concerning the data register R1 and a read signal RB2 concerning the data register R2 are made active by the address decoder 11, as a result of which the operand OP1 is supplied from the data register R1 to the ALU 51 via the A bus 61 and the first selector 71 and the operand OP2 is supplied from the data register R2 to the ALU 51 via the B bus 62 and the second selector 72. The ALU 51 performs addition of the operand OP1 and the operand OP2 (for example, addition of two positive fixed-point numbers). If such an addition operation causes an arithmetic overflow, then OV_ALU=1 and S_ALU=0. At this time, the write signal W0 concerning the data register R0 is made active by the address decoder 11, for WAd=0. In the absence of an occurrence of arithmetic overflow, an arithmetic operation result R_ALU produced by the ALU 51 is written into the data register R0 via the C bus 63. However, OV=OV_ALU=1 in this situation, so that the data register R0 is write inhibited (in other words, the arithmetic operation result R_ALU is not allowed to be written into the data register R0) and the overflow flag OV0 and the sign flag S0 are set at "1" and at "0", respectively. In such a case, no positive saturation value in place of the arithmetic operation result R_ALU is written into the data register R0, therefore achieving fast completion of the execution of the first instruction (ADD instruction).

If the instruction decoder 90 decodes the second instruction (MUL instruction), then MULEX=1, RAAd=0, RBAd=3, and WAd=0. Accordingly, a read signal RA0 concerning the data register R0 and a read signal RB3 concerning the data register R3 are made active by the address decoder 11. As a result, the data register R0 is about to be read for the transmission of data stored therein to the A bus 61 and the data register R3 is about to be read for the transmission of data stored therein to the B bus 62. At this time, since OV3=0, the data stored in the data register R3 is actually read out onto the B bus 62 and is supplied, via the fourth selector 74, to the MUL 52 as the operand OP4. However, since OV0=1, this makes the reading of the data stored in the data register R0 onto the A bus 61 invalid. Then, the overflow signal OVA and the saturation value sign signal SA are supplied to the third selector 73. Here, OVA=OVA0= OV0=1 and SA=SA0 =S0=0, and the third selector 73 provides, as the operand OP3, a positive saturation value in place of the arithmetic operation result R_ALU to the MUL 52. The MUL 52 performs multiplication of the operand OP3 and the operand OP4. If this multiplication operation causes no arithmetic overflow, then OV_MUL=0. At this time, since WAd=0, the write signal W0 concerning the data register R0 is made active by the address decoder 11. As a result, an arithmetic operation result R_MUL produced in the MUL 52 is written, via the C bus 63, into the data register R0. The overflow flag OV0 is reset to "0".

In the above description, an example case, in which an overflow result concerning an addition instruction is referred to, has been explained. The same is applied to a case in which an overflow result concerning a multiplication instruction is referred to.

In accordance with the above-described data processing system of the present invention, a structure is employed for the register file 10 which includes, for each of the four data registers 31, the overflow flag register 32 and the sign flag register 33. Additionally, at the stage when data is referred to, positive or negative saturation values are generated in the first to fourth selectors 71–74, which makes it possible to improve data processing (such as saturation processing) efficiency. It becomes unnecessary for the programmer to be aware of the existence of the overflow flag registers 32 and the sign flag registers 33. Additionally, with respect to arithmetic operations with the occurrence of arithmetic overflow, neither the writing of data into the register file 10 and nor the reading of data from the register file 10 is carried out. Accordingly, as the frequency at which arithmetic overflow occurs increases, greater reductions in power consumption are achieved.

Supplementary explanation for the first to fourth selectors 71–74 is made here. For example, if it is necessary to by-pass data present on the C bus 63 to an input of the ALU 51, what is needed is just to add the function of a bus selector to the first selector 71. In such a case, the first selector 71 provides any one of data present on the A bus 61, data present on the C bus 63, a positive saturation value, and a negative saturation value to the ALU 51. The other selectors 72–73 can likewise be modified. Alternatively, it may be arranged such that a bus selector, originally disposed in a data processing system, performs a function of providing a positive or a negative saturation value.

The register file 10 can be made up of any arbitrary number of data registers 31. In such a case, however, the overflow flag register 32 and the sign flag register 33 are provided for each data register 31.

What is claimed is:
1. A data processing system which performs a saturation processing function on the occurrence of arithmetic overflow, said data processing system comprising:
(a) an arithmetic unit which performs a function of executing a specified arithmetic operation and gener- ating an overflow signal indicative of the presence or absence of an occurrence of overflow in said arithmetic operation, (b) a data register for storing data representative of an arithmetic operation result produced in said arithmetic unit, (c) an overflow flag register for storing said overflow signal generated in said arithmetic unit as an overflow flag, and (d) a selector for selecting between said data stored in said data register and a fixed saturation value for forwarding to said arithmetic unit at the moment when said data register is about to be read:

if said overflow flag indicates the absence of an occurrence of arithmetic overflow, said selector then selects and provides said data stored in said data register to said arithmetic unit, and if said overflow flag indicates the presence of an occurrence of arithmetic overflow, said selector then selects and provides said fixed saturation value to said arithmetic unit.

2. The data processing system of claim 1, wherein said data register is write inhibited if said overflow signal indicates the presence of an occurrence of arithmetic overflow.

3. The data processing system of claim 1, wherein if said overflow flag indicates the presence of an occurrence of arithmetic overflow at the moment when said data register is about to be read, said data stored in said data register is made invalid when actually read out therefrom.

4. The data processing system of claim 1, wherein said arithmetic unit further performs a function of generating a saturation value sign signal providing an indication of which one of a positive and a negative saturation value should replace said arithmetic operation result in the presence of an occurrence of overflow in said arithmetic operation, wherein said data processing system further comprises a sign flag register for storing said saturation value sign signal generated in said arithmetic unit as a sign flag, and wherein said selector performs a function of providing a positive saturation value or a negative saturation value, whichever corresponds to said sign flag, to said arithmetic unit if said overflow flag indicates the presence of an occurrence of arithmetic overflow at the moment when said data register is about to be read.

5. A data processing method employing an arithmetic unit which performs a function of generating an overflow signal indicating the presence or absence of an occurrence of arithmetic overflow and a data register for storing data representative of an arithmetic operation result produced in said arithmetic unit, said data processing method comprising the steps of:

(a) storing said generated overflow signal as a flag, (b) generating a fixed saturation value if said flag indicates the presence of an occurrence of arithmetic overflow at the moment when said data register is about to be read, and (c) providing said generated saturation value to said arithmetic unit.

* * * * *